United States Patent Office 3,755,441
Patented Aug. 28, 1973

3,755,441
HYDROXY BENZOIC THIOLANHYDRIDES
Stanley B. Mirviss, Stamford, Conn., and Carl C. Greco, Garnerville, N.Y., assignors to Stauffer Chemical Company, New York, N.Y.
No Drawing. Continuation-in-part of abandoned application Ser. No. 788,054, Dec. 30, 1968. This application Oct. 22, 1970, Ser. No. 83,228
Int. Cl. C07c *153/00*
U.S. Cl. 260—545 R     3 Claims

ABSTRACT OF THE DISCLOSURE

Vinyl polymer compositions are stabilized against degradation and discolorization due to heat by adding to the polymer a stabilizing amount of a novel compound of the formula:

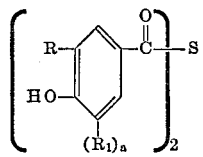

wherein R and $R_1$ are alkyl radicals consisting essentially of carbon and hydrogen and containing from 1 to about 12 carbon atoms and $a$ is an integer with a value of from zero to one inclusive.

RELATED APPLICATION

This application is a continuation-in-part of application Ser. No. 788,054, filed Dec. 30, 1968 now abandoned.

TECHNICAL DISCLOSURE OF THE INVENTION

According to the present invention there is provided novel compounds of the formula:

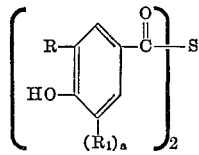

wherein R and $R_1$ are alkyl radicals consisting essentially of carbon and hydrogen containing from 1 to 12 carbon atoms and $a$ is an integer having a value of from zero to one inclusive; and, heat stable compositions comprising the novel compounds intimately admixed with vinyl polymers. It is intended in the practice of the present invention that R and $R_1$ can be the same or different and that $a$ can have a value of zero or one.

The above described compounds are found to be particularly effective as heat stabilizers in vinyl polymers such as the polyvinyl halides; polyvinylidene halides; polyolefins such as polyethylene and polypropylene and chlorinated polyethylene; acrylonitrile-butadiene-styrene compositions, copolymers made from monomers at least one of which is a halogen containing monomer; and, post chlorinated polymers.

The use of the term alkyl radicals consisting essentially of carbon and hydrogen and containing from 1 to 12 carbon atoms is intended to include alkyl radicals which can contain certain other substituent groups provided that such groups do not substantially change the nature of the alkyl group. Such substituent groups can contain nitrogen, oxygen, sulfur or halogen. For example, chlorine or bromine can be present as substituents in the alkyl group, oxygen can be present in a methoxy, ethoxy, or propoxy substituent and nitrogen can be present as an amino substituent. The term halogen as used herein means fluorine, chlorine, bromine, and iodine. Preferably, these alkyl groups will contain from about 1 to 8 carbon atoms, and most preferably, from about 3 to 6 carbon atoms.

Illustrative of the novel compounds useful in the practice of the present invention are:

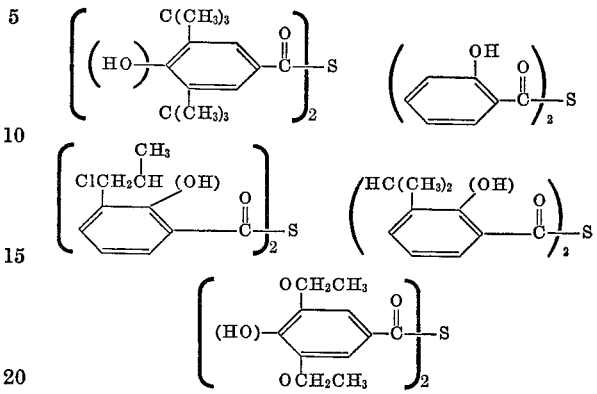

The above compounds are presented for purposes of illustration and are not intended to be an exhaustive catalog of all of the novel compounds of this invention.

The novel compounds of the present invention are particularly effective stabilizing agents when the hydroxy group is substituted in a position ortho to the carbothiolic group or when two alkyl radicals are substituted in a position ortho to the hydroxy group. These compounds are even more effective when the alkyl radicals substituted in a position ortho to the hydroxy group contain from 3 to 6 carbon atoms and particularly when the alkyl radicals have more than one carbon atom joined to the carbon atom which is attached to the phenyl ring.

The novel thiolanhydrides of the present invention can be prepared in good yields by reacting a thiolacid and an acyl chloride in a suitable solvent at from −10° C. to about 130° C. The temperature range depends upon the particular reactants involved and the solvent employed. The reaction may be carried out at from subatmospheric to superatmospheric pressure. Provision must, however, be made for removal of the HCl formed from the reaction. This may be accomplished by the use of an acid acceptor such as pyridine or triethylamine or when operating near atmospheric pressure by the use of a dry inert gas purge through the system.

Solvents suitable for the reaction are aromatic solvents such as benzene, toluene, and xylene, chlorinated solvents such as chloroform, carbon tetrachloride, and chlorobenzene, paraffinic solvents such as heptane, hexane and cyclohexane, and solvents such as pyridine, tetrahydrofuran and acetonitrile.

For example, 1-hydroxy-4-benzoic thiolanhydride can be prepared by reacting 1-hydroxy-4-benzoyl chloride with 1-hydroxy-4-benzoic thiolacid in benzene at reflux temperatures. When HCl has ceased evolving from the reaction, the benzene is removed and the 1-hydroxy-4-benzoic thiolanhydride is crystallized.

The acyl chlorides useful for the practice of the present invention can be prepared by the reaction of the desired acid with phosphorus trichloride or thionyl chloride. Preferably the hydroxyl group is sterically hindered or blocked during the reaction.

The thiolacid can be prepared by reacting an acyl chloride with $H_2S$ in an anhydrous acid acceptor such as pyridine at from −10° C. to about 120° C. Preferably from about 10° C. to about 60° C.

The thiolanhydrides useful in the practice of the present invention can also be prepared by reacting a suitable acid chloride with a slight excess of $Na_2S$ in a water solution at from 0° C. to about 100° C. Preferably, a small amount of sodium carbonate is added to the $Na_2S$ solution. The reaction can be conducted at subatmospheric to superatmospheric pressure. The thiolanhydride can be recovered from the water by filtration. This method is at times the preferred method for preparing thiolanhydride compounds; for, when the anhydride is recovered from the water, little subsequent purification is necessary to recover a useable material.

The term vinyl polymer as used herein denotes those solid homopolymers, copolymers, terpolymers and post chlorinated polymers which require heat stabilization made from ethylenically unsaturated monomers by an addition polymerization reaction. Included within the definition of ethylenically unsaturated materials useful in the preparation of polymers suitable for the practice of the present invention are the vinyl halide monomers of the formula:

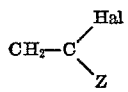

wherein Z can be selected from halogen or hydrogen and Hal is halogen for example, vinyl chloride, vinyl bromide, vinylidene chloride, and the like; mono-olefinic hydrocarbons such as ethylene and propylene; styrene and its nuclear, alpha-alkyl or aryl substituted derivatives such as p-methyl or butyl styrene; alphamethyl or propyl styrene; phenyl styrene and halogenated styrenes such as alpha-chlorostyrene; mono-olefinically unsaturated esters including vinyl esters, e.g., vinyl acetate, vinyl stearate and vinyl benzoate; alkyl methacrylates, e.g. methyl and propyl methacrylates; alkyl crotonates; alkyl acrylates, e.g., methyl acrylate, hydroxy ethyl acrylate, and tertiary butylamino acrylate; isopropenyl esters, isopropenyl halides; vinyl esters of halogenated acids; alkyl and methallyl esters; esters of alkenyl-alcohols; haloalkyl acrylates; alkyl alpha-cyano acrylates; maleates, e.g., monomethyl maleate, diethyl maleate; fumarates, e.g., monoethyl fumarate and dimethyl fumarate; diethyl glutaconate; mono-olefinically unsaturated organic nitriles such as fumaronitrile, acrylonitrile and methacrylonitrile; mono-olefinically unsaturated carboxylic acids such as cinnamic, maleic and fumaric and maleic anhydride and the like. Amides of these acids are also useful. Vinyl ethers and vinyl alkyl ethers, vinyl sulfides such as vinyl β-chloroethyl sulfide can also be utilized. Diolefinically unsaturated hydrocarbon containing two olefinic groups in conjugated relation and the halogenated derivatives such as butadiene-1,3 and 2-chlorobutadiene-1,3 can also be utilized in preparation of suitable polymer compositions.

The terms vinyl halide polymer, ethylene polymer, and propylene polymer are used herein to denote homopolymers, copolymers, and terpolymers of the named monomer and suitable monomers which can be polymerized by an addition polymerization reaction. The following are examples of copolymers which can be used in the practice of the present invention: vinyl chloride-vinyl acetate, vinyl chloride-vinylidene chloride, vinyl chloride-acrylonitrile, vinyl chloride-maleate esters, vinyl chloride-vinyl ethers, vinyl chloride-ethylene, vinyl chloride-propylene, ethylene-vinyl acetate, ethylene-acrylonitrile. The examples are illustrative only and are not intended to be exhaustive of the many copolymers whose stability can be enhanced by the compounds of the present invention.

The proportions of the hydroxy benzoic thiolanhydrides of the present invention which must be employed to make satisfactory heat stabilized compositions will vary over a wide range depending upon the particular vinyl polymer, the degree of stabilization needed, the end use of the resin, the presence of plasticizers and co-stabilizing additives, as well as the time and temperature requirements of the final processing. The presence of a stabilizing amount of from about 0.01% to about 15% by weight of the compounds of the present invention will be sufficient for most applications, although the preferred range is from about 0.5% to about 10.0% by weight of compounds of the present invention based on the weight of the polymer.

The compounds of the present invention can be advantageously employed in combination with co-stabilizing additives known in the art. The preferred co-stabilizing additives are the organic phosphites, dialkyl and diaryl phosphonates, organic and inorganic sulfites such as $Na_2SO_3$, $NaHSO_3$ and $(RO)_2SO$ where R is an alkyl or arylalkyl radical, zinc soaps, phenolic anti-oxidants, mercaptides, organotin compounds such as dialkyltin carboxylates or mercaptides, alkyl stannoic acid and alkylthiostannoic acid.

The compounds of the present invention can be incorporated into the polymer composition by methods familiar to one skilled in the art for the addition of similar material to the polymer blends such as by mixing in a ribbon mixer or by the intensive mixing of a Henschel™ or Welex™ mixer.

The novel compounds of the present invention can be prepared in accordance with procedures known in the art, as well as by the procedures of the following examples.

EXAMPLE I

This example illustrates the preparation of 2,6-ditertiary butyl-1-hydroxy-4-benzoic thiolanhydride, i.e.

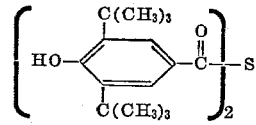

Step 1.—Preparation of 2,6-di-tertiary butyl-1-hydroxy-4-benzoyl chloride

To a 2 liter flask fitted with a gas inlet tube, condenser and stirrer is added 400 milliliters of benzene, 103 grams of 2,6-di-tertiary butyl-1-hydroxy benzene and 95 grams of stannic chloride ($SnCl_4$). The gas inlet tube is adjusted to be below the level of the benzene. The mixture is brought to reflux temperatures and phosgene ($COCl_2$) is slowly added to the mixture. Over a period of 3 hours, 50 grams of phosgene is added to the mixture. The mixture is refluxed for an additional hour after the phosgene has been added. At the end of the reflux period the temperature is brought to room temperature and the stannic chloride filtered from the mixture. The 2,6-di-tertiary butyl-1-hydroxy-4-benzoylchloride is recovered by removal of the benzene at reduced pressure.

Step 2.—Preparation of 2,6-di-tertiary butyl-1-hydroxy-4-benzoic thiolanhydride

A solution of 20 grams of sodium sulfide ($Na_2S$), and 6.5 grams of sodium carbonate in 200 milliliters of water is prepared. Without purification the 2,6-di-tertiary butyl-1-hydroxy-4-benzoyl chloride prepared in the previous step is slowly added to the solution of $Na_2S$ at 10° C. The mixture is held at 10° C. during the acid chloride addition and maintained at 10° C. for 3 hours with agitation. The 2,6-di-tertiary butyl-1-hydroxy-4-benzoic thiolanhydride is recovered from the reaction mixture by filtering and washed with water. It can be used without further purification.

EXAMPLE 2

This example illustrates the preparation of 6-tertiary butyl-1-hydroxy-2-benzoic thiolanhydride, i.e.

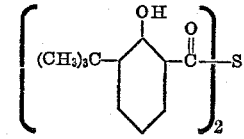

Step 1.—Preparation of 6-tertiary butyl-1-hydroxy-2-benzoyl chloride

To a 2 liter flask fitted with a gas inlet tube, condenser and stirrer is added 400 milliliters of benzene, 103 grams of z-tertiary butyl-1-hydroxy benzene and 95 grams of stannic chloride (SnCl₄). The gas inlet tube is adjusted to be below the level of the benzene. The mixture is brought to reflux temperatures and phosgene (COCl₂) is slowly added to the mixture. Over a period of 3 hours, 50 grams of phosgene is added to the mixture. The mixture is refluxed for an additional hour after the phosgene has been added. At the end of the reflux period the temperature is brought to room temperature and the stannic chloride filtered from the mixture. The 6-tertiary butyl-1-hydroxy-2-benzoyl chloride is recovered by removal of the benzene at reduced pressure.

Step 2.—Preparation of 6-tertiary butyl-1-hydroxy-2-benzoic thiolanhydride

A solution of 20 grams of sodium sulfide (Na₂S), and 6.5 grams of sodium carbonate in 200 milliliters of water is prepared. Without purification the 6-tertiary butyl-1-hydroxy-2-benzoyl chloride prepared in the previous step is slowly added to the solution of Na₂S at 10° C. The mixture is held at 10° C. during the acid chloride addition and maintained at 10° C. for 3 hours with agitation. The 6-tertiary butyl-1-hydroxy-2-benzoic thiolanhydride is recovered from the reaction mixture by filtering and washed with water. It can be used without further purification.

EXAMPLE 3

A number of stabilized polymer compositions are prepared by intimately admixing a particulate sample of each of the below listed polymers with 3.0%, by weight of each polymer sample, of one of the novel stabilizers of this invention as listed hereinbelow. The individual stabilizer is admixed with the particulate polymer by a means suitable for the particular polymer being evaluated. After mixing, the stabilized composition is tested by conventional milling on a heated two roll mill to determine its heat stability. The mill rolls are heated to a temperature which is sufficient to permit milling of the polymer and which is also sufficiently high to degrade an unstabilized sample polymer in two hours. Samples are taken from the mill every 10 minutes and evaluated. Unmilled samples are fluxed to form a homogenous composition and are aged at ambient temperatures. In each case, the stabilizers of this invention are found to provide enhanced stabilization to each of the polymers with which they are admixed.

The polymers evaluated by the above procedure are:
Polyethylene (density 0.915)
Polyethylene (density 0.945)
Polypropylene
Polyvinyl chloride
Polyvinylidene chloride
Styrene-acrylonitrile-butadiene copolymer (ABS Type B)
Styrene-acrylonitrile-butadiene copolymer (Type G)
Vinyl chloride:vinyl acetate copolymer (90:10)
Vinyl chloride-acrylonitrile copolymer (90:10)

The stabilizers thus evaluated are:

2,6-di-tertiary butyl-1-hydroxy-4-benzoic thiolanhydride
6-tertiary butyl-1-hydroxy-2-benzoic thiolanhydride.

Variations may be made in proportions, procedures and materials without departing from the scope of this invention as defined in the following claims.

What is claimed is:
1. Compounds of the formula:

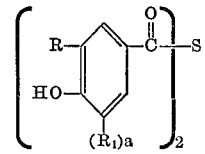

wherein R and R₁ are selected from the group consisting of alkyl radicals containing from 1 to about 12 carbon atoms, lower alkoxy, and alkyl radicals containing from 1 to about 12 carbon atoms having substituent moieties selected from the group consisting of bromine, chlorine, fluorine, lower alkoxy and amino, and $a$ is an integer with a value of from zero to one inclusive.

2. 2,6-di-tertiary butyl-1-hydroxy-4-benzoic thiolanhydride.

3. 6-tertiary butyl-1-hydroxy-2-benzoic thiolanhydride.

References Cited

UNITED STATES PATENTS 3,554,989    1/1971    Stamm _____ 260—79 S

FOREIGN PATENTS 201,389    9/1967    USSR _____ 260—545

OTHER REFERENCES

The Condensed Chemical Dictionary, pp. 39, 541, 1961.

LORRAINE A. WEINBERGER, Primary Examiner
R. GERSTL, Assistant Examiner

U.S. Cl. X.R.
260—45.95

UNITED STATES PATENT AND TRADEMARK OFFICE
CERTIFICATE OF CORRECTION

PATENT NO. : 3,755,441
DATED : August 28, 1973
INVENTOR(S) : Stanley B. Mirviss and Carl C. Greco It is certified that error appears in the above-identified patent and that said Letters Patent are hereby corrected as shown below:

Column 5, line 5

Change "Z-tertiary" to -- 2-tertiary --;

Line 45 before the word "polymer" insert -- of the same --;

Column 6, line 10 change "chloride-acrylonitrile" to -- chloride:acrylonitrile --.

Signed and Sealed this sixteenth Day of March 1976

[SEAL]

Attest:

RUTH C. MASON
Attesting Officer

C. MARSHALL DANN
Commissioner of Patents and Trademarks